UNITED STATES PATENT OFFICE 2,473,994

1,3-DIOXOLANE POLYMERS

William F. Gresham, Wilmington, Del., assignor to E. I. du Pont de Nemours & Company, Wilmington, Del., a corporation of Delaware No Drawing. Application August 4, 1945, Serial No. 609,037

8 Claims. (Cl. 260—615)

This invention relates to a process for the preparation of organic polymeric compounds and more particularly to their preparation from 1,3-dioxolane and linear acetals. It likewise relates to the resulting polymers. This application is a continuation-in-part of U. S. Serial No. 424,292, filed December 24, 1941, and patented August 14, 1945, as U. S. Patent 2,382,874.

The present invention provides new reaction products obtainable from the reaction of 1,3-dioxolane with other organic compounds. Another object of the invention is to provide new compositions of matter from 1,3-dioxolane or its substitution products and linear acetals. Yet another object is to provide a process for the interaction of 1,3-dioxolane and its substitution products with acetals under acid conditions. Another object is to provide reaction conditions and catalysts for such reactions, whereby valuable products are obtainable. Other objects and advantages of the invention will hereinafter appear.

Valuable products are obtained in accord with the invention by reacting 1,3-dioxolane, substituted 1,3-dioxolane, or reactants which form these compounds with linear acetals including the formals, e. g.

Dimethyl formaldehyde acetal
Diethyl formaldehyde acetal
Methyl ethyl formaldehyde acetal
Dipropyl formaldehyde acetal
Methyl propyl formaldehyde acetal
Ethyl propyl formaldehyde acetal
Dibutyl formaldehyde acetal
Methyl butyl formaldehyde acetal
Ethyl butyl formaldehyde acetal
Propyl butyl formaldehyde acetal
Dibenzyl formaldehyde acetal
Dinaphthyl formaldehyde acetal and the higher formals in which $R_1$ and $R_2$ are similar or dissimilar alkyl, aryl, aralkyl, cyclic or alicyclic groups and especially hydroxy alkyl substitutions such as: compounds having the structural formula $RCH(O(CH_2)_nOH)_2$, in which $n$ is a positive integer greater than 1, examples of which include:

(Methoxymethoxy) ethanol,
$CH_3OCH_2O(CH_2)_2OH$
(Ethoxymethoxy) ethanol,
$C_2H_5OCH_2O(CH_2)_2OH$
(Propoxymethoxy) ethanol,
$C_3H_7OCH_2O(CH_2)_2OH$
(Butoxymethoxy) ethanol,
$C_4H_9OCH_2O(CH_2)_2OH$
(Methoxyisopropoxy) ethanol,
$CH_3OC(CH_3)_2O(CH_2)_2OH$
(Methoxyethoxymethoxy) ethanol,
$CH_3O(CH_2)_2OCH_2O(CH_2)_2OH$
(Alpha-methoxyethoxy) ethanol,
$CH_3OCH(CH_3)O(CH_2)_2OH$
(Methoxymethoxy) propanol,
$CH_3OCH_2O(CH_2)_3OH$
Beta-(methoxymethoxy) propanol,
$CH_3OCH_2OCH(CH_3)CH_2OH$
(Methoxymethoxy) butanol,
$CH_3OCH_2O(CH_2)_4OH$ the higher aldehyde acetals,

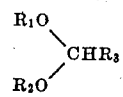

in which $R_1$ and $R_2$ are similar to the above and $R_3$ is a substituted or unsubstituted alkyl group which will give products similar to those described under the formals for acetaldehyde, propanal, butanal, and higher symmetrical and unsymmetrical aldehyde acetals. Substituted acetals may be used in lieu of or in conjunction with the acetals, such as:

2,2-dimethoxypropane $(CH_3)_2C(OCH_3)_2$
2,2-diethoxypropane, $(CH_3)_2C(OC_2H_5)_2$
2-methoxy-2-ethoxypropane,
$(CH_3)_2C(OCH_3)OC_2H_5$ The products of the invention are of relatively high molecular weight and will hereinafter be referred to as polymers, which term will include all products containing 1,3-dioxolane (or substituted 1,3-dioxolane) and acetal residues, the polymer containing at least three residues, two of which are similar. For example, the polymers resulting from the reaction of 1,3-dioxolane with methylal will contain at least one 1,3-dioxolane residue as $—CH_2OCH_2CH_2O—$ and at least one methylal residue as —OCH₂O—. The polymers of the invention are believed to be primarily linear in form although cyclic polymers may be present.

The acetals may be reacted in accord with the procedural details more fully particularized hereinafter, with 1,3-dioxolane and its substitution products. 1,3-dioxolane has the chemical formula with numbering as shown:

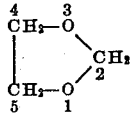

and may be obtained by reacting formaldehyde or a formal with ethylene glycol. Products with substituents in the 2 position can be readily obtained by reaction of ketones or other aldehydes either aliphatic or aromatic with ethylene glycol. Thus, by way of example, many compounds are obtained which may be employed in accord with the invention, such as 2-methyl-1,3-dioxolane,
2-ethyl-1,3-dioxolane,
2,2-dimethyl-1,3-dioxolane,
2,2-diethyl-1,3-dioxolane,
2-phenyl-1,3-dioxolane,
2,2-methylphenyl-1,3-dioxolane, and higher dioxolanes substituted in like manner which may, for example, be obtained from ethylene glycol and acetaldehyde, propanal, acetone, diethyl ketone, benzaldehyde, methyl phenyl ketone, and higher substituted aldehydes respectively. The invention likewise contemplates the use of dioxolanes substituted in the 4 and/or 5 positions. These dioxolanes are obtained by the interaction of substituted 1,2-glycols with aldehydes, for example, 1,2-propylene glycol plus formaldehyde will give 4-methyl-1,3-dioxolane and similarly the following dioxolanes can be readily prepared from formaldehyde and the corresponding glycols:

4-ethyl-1,3-dioxolane,
4-propyl-1,3-dioxolane,
4,5-dimethyl-1,3-dioxolane.

In lieu of 1,3-dioxolane, reactants may be used which form 1,3-dioxolane and in such reactions there would be present the acetal to be reacted together with, for example, formaldehyde and ethylene glycol, or other reactants which will form 1,3-dioxolane.

Valuable polymers are obtainable by the reaction of small amounts of 1,3-dioxolane or its derivatives with large amounts of the acetal, that is, in the order of 1-100 and the reverse is also true. The greater the amount of 1,3-dioxolane present, the greater becomes the viscosity of the polymers until solids are eventually produced, while contrarywise, the greater the ratio of the acetal the less viscous will be the resulting polymer. There appears to be no limiting factor restricting the proportion of reactants.

The reaction between the 1,3-dioxolane and the acetal is effected at temperatures ranging between −80 and 300° and preferably between 0 and 150° C. Atmospheric, sub- or superatmospheric pressures may be used and, if the last, pressure may range between 1 and 1000 atmospheres or higher. Normally excellent results are obtained at or about atmospheric pressure. If desired, the temperature of the reaction, especially when polymerization is carried out at the boiling point of the reaction mixture, may be controlled by varying the pressure on the boiling reactants.

It has been found advantageous to effect the reaction in the presence of an acid catalyst, such, for example, as sulfuric acid, phosphoric acid; the halogen acids, such as hydrochloric acid, hydrofluoric acid (alone or with BF₃); boron fluoride (including its complexes with water, acids, esters, alcohols, and the like), paratoluene sulfonic acid, camphor sulfonic acid, and other acid catalysts of this general nature. Friedel-Crafts type catalysts other than BF₃ may be used, such as AlCl₃, AlBr₃, FeCl₃, and so forth, as well as inorganic acids generally and their salts such as sodium acid sulfate, sodium acid phosphate, and so forth.

The catalyst may be supported or not on inert supports such as charcoal, silica gel (which alone is a catalyst for the reaction), kieselguhr, and so forth. Concentrations of BF₃, H₂SO₄ and similarly strong catalysts may be extremely low; less than 0.1%, and amounts down to as low as 0.001% of the strong acid catalyst have been found sufficient to give polymers although high concentrations of the catalyst even equal to or greater than the weight of the dioxolane are likewise satisfactory.

The reaction is preferably continued approximately to equilibrium in order to obtain the above defined polymeric organic compounds. The reaction may then be stopped by destroying the catalyst. This may be done by removing it (in the case of silica gel, kieselguhr, and the like) or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressure. As soon as the catalyst has been neutralized, the reaction ceases. The neutralized catalyst may be filtered off and the polymerized product which remains treated for the recovery of the polymers.

In the reaction of the dioxolanes with the acetals and more especially when the higher molecular weight products are being prepared there usually will be found in the reaction mixture along with the polymer unreacted dioxolane and the acetal together with by-products and polymers which it is not desired to produce. It is possible to inhibit the formation of the undesired products by carrying out the process in an intermittent or continuous manner whereby the desired polymer is withdrawn from the reaction zone and the undesirable products, after being separated therefrom, are returned to the reaction zone. By this means it is possible to obtain high yields of the desired polymer.

In addition to being instrumental in stopping the reaction at the desired point, the neutralization of the catalyst tends to stabilize the polymers. It follows, therefore, that for high temperature uses no acid should be present in the polymers. They should preferably be neutral or on the alkaline side.

Examples will now be given illustrating embodiments of the invention but it will be understood that it will not be limited by the details thereof. Parts are by weight unless otherwise indicated.

*Example 1.*—A reaction mixture consisting of 222 parts of 1,3-dioxolane, 684 parts of methylal and 4.5 parts of sulfuric acid was heated under a return condenser supplied with a calcium chloride drying tube for 6.5 hours. Subsequent to neutralization of the catalyst by addition of 4.04 parts of sodium hydroxide dissolved in 10 parts of water to the cooled reaction mixture, the product was fractionally distilled, in the final stages under reduced pressure. 64.5 parts of di(methoxymethoxy) ethane $$(CH_3OCH_2OCH_2CH_2OCH_2OCH_3)$$

B. P. 83° C./29 mm., was obtained. Physical and chemical constants of this compound are: hydroxyl No. 0.0, $N_D^{25}$ 1.4014, density at 25° C. 1.0015.

*Example 2.*—Under conditions described in Example 1, 602 parts of di(β-chloroethyl) formal, 258 parts of 1,3-dioxolane and 4 parts of sulfuric acid gave 105 parts of di(β-chloroethoxymethoxy) ethane $$(ClCH_2CH_2OCH_2OCH_2CH_2OCH_2OCH_2CH_2Cl)$$

B. P. 128° C./28 mm. Unconverted reactants and undesirable by-products were recycled. This gave an additional 84 parts of di(β-chloroethoxymethoxy) ethane.

*Example 3.*—A reaction mixture of 173 parts (1 mole) of di(β-chloroethyl) formal, 740 parts (10 moles) of 1,3-dioxolane and 4 parts (0.04 mole) sulfuric acid was heated for five hours on a steam bath, ammonia was introduced to substantial neutralization and then 3.4 parts of sodium hydroxide added in 10 parts of water; 233.5 parts of the unchanged 1,3-dioxolane and lower boilers being removed by distillation. Benzene was added to the residue, the mixture filtered, benzene removed by distillation and 669.6 parts of a polymer obtained. It is an almost colorless viscous liquid with a solubility of slightly less than 10% in water which contains the group $$ClCH_2CH_2OCH_2OCH_2CH_2OCH_2OCH_2CH_2OCH_2—$$

The molecular weight as determined by the boiling point method was between 760 and 770.

*Example 4.*—A reaction mixture of 328 parts (2 moles) of di(β-methoxyethyl) formal, 444 parts (6 moles) of 1,3-dioxolane and 3.5 parts (0.034 mole) sulfuric acid was heated on a steam bath for 5 hours. The sulfuric acid was neutralized with ammonia followed by 3.1 parts of sodium hydroxide and 10 parts of water. The lower boiling substances were distilled off at a temperature at about 100° C. and a pressure of 1 mm. 187.5 parts. The solid salts were then filtered off. The undistilled liquid consisting of 556.8 parts of a polymer, is a very lightly colored mobile liquid miscible with water which contains the group $$CH_3OCH_2CH_2OCH_2OCH_2CH_2$$
$$OCH_2OCH_2CH_2OCH_2O—$$

This liquid on analysis gave a molecular weight between 375 and 377 as determined by the boiling point method.

The products described are suitable for insecticidal uses, as carriers for contact sprays such as nicotine solutions, the products acting as wetting and penetrating agents. They may be used as absorbents for refrigerants; as flotation agents, the xanthates and sulphides of the lower molecular weight products being employed in this capacity; as extractants for vegetable and animal oils; as ingredients in paint and varnish removers; as solvents in pigment drying; as softening agents in cork processing; and as carbon removers for use in internal combustion engines.

I claim:

1. A process for producing polymers having 1,3-dioxolane residues (—OCH$_2$OCH$_2$CH$_2$—) and linear formal residues (—OCH$_2$O—) there being present at least three of the residues, at least two of which are 1,3-dioxolane residues and at least one is a linear formal residue, which consists in subjecting at least two moles of 1,3-dioxolane per mole of a linear formal to polymerization by mixing together in the presence of an acid catalyst.

2. A process for producing polymers having 1,3-dioxolane residues (—OCH$_2$OCH$_2$CH$_2$—) and methylal residues (—OCH$_2$O—) there being present at least three of the residues, at least two of which are 1,3-dioxolane residues and at least one is a methylal residue, which consists in subjecting at least two moles of 1,3-dioxolane per mole of the methylal to polymerization by mixing together in the presence of an acid catalyst.

3. The process of claim 1 conducted at temperatures between —80 and 300° C. and under a pressure between 1 and 1000 atmospheres.

4. The process of claim 1 conducted with sulfuric acid as the catalyst.

5. A process for the preparation of a polymer containing the structure $$ClCH_2CH_2OCH_2OCH_2CH_2OCH_2OCH_2CH_2OCH_2—$$

which comprises reacting approximately one mole of di(β-chloroethyl) formal with approximately 10 moles of 1,3-dioxolane in the presence of 0.04 mole of sulfuric acid, the mixture being heated for about five hours on a steam bath, neutralizing the catalyst with ammonia and aqueous sodium hydroxide, removing the unconverted 1,3-dioxolane by distillation and thereafter recovering the polymer.

6. A process for the preparation of a polymer containing the group $$CH_3OCH_2CH_2OCH_2OCH_2CH_2$$
$$OCH_2OCH_2CH_2OCH_2O—$$

which consists in heating on a steam bath for approximately five hours a mixture containing approximately two moles of di(β-methoxyethyl) formal, approximately six moles of 1,3-dioxolane in the presence of approximately 0.034 moles of sulfuric acid, neutralizing the catalyst first with ammonia and then with aqueous sodium hydroxide, separating the unreacted 1,3-dioxolane by distillation and recovering the polymer.

7. A process for producing polymers having 1,3-dioxolane residues (—OCH$_2$OCH$_2$CH$_2$—) and linear acetal-residues (—ORO—, in which R is an alkylene group) which polymer contains at least three of the residues, two of which are identical, which consists in subjecting at least two moles of 1,3-dioxolane and a linear acetal which contains the group —ORO— in which R is an alkylene group to polymerization by mixing together in the presence of an acid catalyst.

8. A polymer which contains the group $$ClCH_2CH_2OCH_2OCH_2CH_2OCH_2OCH_2CH_2OCH_2—$$

which has the molecular weight as determined by the boiling point method between 760 and 770 and has been prepared by reacting one mol of di(betachloroethyl) formal with at least two mols of 1,3-dioxolane in the presence of an acid catalyst.

WILLIAM F. GRESHAM.

REFERENCES CITED

The following references are of record in the file of this patent:

UNITED STATES PATENTS

| Number | Name | Date |
| --- | --- | --- |
| 2,382,874 | Gresham | Aug. 14, 1945 |